United States Patent
Yang et al.

(10) Patent No.: US 11,263,632 B2
(45) Date of Patent: Mar. 1, 2022

(54) INFORMATION SHARING METHODS, APPARATUSES, AND DEVICES

(71) Applicant: ALIPAY (HANGZHOU) INFORMATION TECHNOLOGY CO., LTD., Zhejiang (CN)

(72) Inventors: Wenyu Yang, Hangzhou (CN); Renhui Yang, Hangzhou (CN); Yuan Chen, Hangzhou (CN); Xinmin Wang, Hangzhou (CN); Feng Qian, Hangzhou (CN); Qianting Guo, Hangzhou (CN); Shubo Li, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/364,706

(22) Filed: Jun. 30, 2021

(65) Prior Publication Data

US 2021/0326880 A1   Oct. 21, 2021

(30) Foreign Application Priority Data

Aug. 31, 2020   (CN) .......................... 202010898505.X

(51) Int. Cl.
    *G06Q 20/40*   (2012.01)
    *G06Q 20/10*   (2012.01)
    *G06Q 20/38*   (2012.01)

(52) U.S. Cl.
    CPC ......... *G06Q 20/4014* (2013.01); *G06Q 20/10* (2013.01); *G06Q 20/3825* (2013.01); *G06Q 20/3827* (2013.01); *G06Q 20/38215* (2013.01)

(58) Field of Classification Search
    CPC ............... G06Q 20/4014; G06Q 20/10; G06Q 20/38215; G06Q 20/3825; G06Q 20/3827
    (Continued)

(56) References Cited

U.S. PATENT DOCUMENTS

2017/0111175 A1   4/2017   Oberhauser et al.
2018/0248699 A1   8/2018   Andrade
(Continued)

FOREIGN PATENT DOCUMENTS

CN   106022754 A   10/2016
CN   108305072     7/2018
(Continued)

OTHER PUBLICATIONS

Ghazizadeh et al. (Secure Open ID Authentication Model by Using Trusted Computing, Hindawi Publishing Corporation, vol. 2014, Article ID 561487, 15 pages, Nov. 27, 2014) (Year: 2014).*
(Continued)

*Primary Examiner* — James D Nigh

(74) *Attorney, Agent, or Firm* — Fish & Richardson P.C.

(57) ABSTRACT

Examples in this application disclose an information sharing methods, media, and systems. One example method includes receiving, by a trusted execution environment (TEE), a user verification result acquisition request from a first institution, where the user verification result acquisition request is configured to request a verification result associated with a user, receiving first encrypted data of the user from a second institution, decrypting the first encrypted data to obtain first user basic data, receiving second encrypted data of the user from a trusted institution, decrypting the second encrypted data of the user to obtain second user basic data, in response to the user verification result acquisition request, determining the verification result of the user to indicate whether the
(Continued)

first user basic data matches the second user basic data, and sending the verification result of the user to the first institution.

20 Claims, 4 Drawing Sheets

(58) Field of Classification Search
USPC .......................................................... 705/64
See application file for complete search history.

(56) References Cited

U.S. PATENT DOCUMENTS

| | | | | |
|---|---|---|---|---|
| 2018/0374072 | A1* | 12/2018 | Zhao | ............... H04L 9/3263 |
| 2020/0106611 | A1 | 4/2020 | Bharatam et al. | |
| 2020/0127847 | A1 | 4/2020 | Yang et al. | |
| 2020/0134616 | A1 | 4/2020 | Rafalko | |
| 2020/0169388 | A1 | 5/2020 | Wei et al. | |
| 2020/0344072 | A1* | 10/2020 | Yan | ............... H04L 9/3231 |

FOREIGN PATENT DOCUMENTS

| | | | | |
|---|---|---|---|---|
| CN | 109615386 | A | 4/2019 | |
| CN | 109635536 | A | 4/2019 | |
| CN | 110610416 | A | 12/2019 | |
| CN | 111090874 | | 5/2020 | |
| CN | 111090888 | | 5/2020 | |
| CN | 111193597 | A | 5/2020 | |
| CN | 111213147 | A | 5/2020 | |
| CN | 111316303 | A | 6/2020 | |
| CN | 111401902 | A | 7/2020 | |
| WO | WO-2017063470 | A1 * | 4/2017 | ............. G06F 21/62 |

OTHER PUBLICATIONS

Baike.baidu.com [online], "Contract," available on or before Apr. 22, 2021, retreived on Aug. 12, 2021, retreived from URL <https://baike.baidu.com/item/%E5%90%88%E5%90%8C/20705>, 31 pages (with machine translation).
Chen, "Exploration of Application Scenarios of BlockchainTechnology in the Banking Industry," Technology Application, Financial Digitization, Mar. 2018, (3):81-82 (with machine translation).
Crosby et al., "BlockChain Technology: Beyond Bitcoin," Sutardja Center for Entrepreneurship & Technology Technical Report, Oct. 16, 2015, 35 pages.
Liu, "Talking about the Application Scenarios of Blockchain InCommercial Banks," Development Forum, Financial Computer of China, Mar. 2020, (3):78-81 (with machine translation).
Nakamoto, "Bitcoin: A Peer-to-Peer Electronic Cash System," www.bitcoin.org, 2005, 9 pages.
Tavares et al., "WalliD: Secure your ID in an Ethereum Wallet," 2018 International Conference on Intelligent Systems (IS), 2018, 714-721.
Extended European Search Report in European Application No. 21182268.9, dated Nov. 10, 2021, 9 pages.
Xiao et al., "Enforcing Private Data Usage Control with Blockchain and Attested Off-chain Contract Execution," European Symposium on Research in Computer Security, Apr. 2019, 16 pages.
Extended European Search Report in European Application No. 21182275.4, dated Dec. 3, 2021, 11 pages.

* cited by examiner

INFORMATION SHARING METHODS, APPARATUSES, AND DEVICES

CROSS-REFERENCE TO RELATED APPLICATIONS

This application claims priority to Chinese Patent Application No. 202010898505.X, filed on Aug. 31, 2020, which is hereby incorporated by reference in its entirety.

TECHNICAL FIELD

The present specification relates to the field of Internet technologies, and in particular, to information sharing methods, apparatuses, and devices.

BACKGROUND

Data sharing is often needed by institutions to process services. A single institution is often unable to obtain enough information to process a service, and needs to obtain information from other institutions. Mobility and accessibility of information (as resources) of institutions are the foundation of many data applications and industry development. However, privacy protection and trustworthiness of information during data exchange and sharing is always a challenge to industry development.

Based on this, how to provide a secure and trustworthy information sharing method becomes an urgent problem that needs to be solved.

SUMMARY

Embodiments of the present specification provide information sharing methods, apparatuses, and devices, so as to improve security and trustworthiness of data in an information sharing process.

To solve the previously-mentioned technical problem, the embodiments of the present specification are implemented as described below.

Some embodiments of the present specification provide an information sharing method, where the method is applied to a privacy computing unit and includes: obtaining a user verification result acquisition request sent by a first institution; determining a verification result of a user that is requested by the user verification result acquisition request, where the verification result is a verification result obtained by performing matching verification on first data and second data; the first data is user basic data obtained by decrypting first encrypted data of the user that is sent by a second institution; the second data is user basic data obtained by decrypting second encrypted data of the user that is sent by a third institution; and the third institution is a trustworthy institution; and sending the verification result to the first institution.

Some embodiments of the present specification provide an information sharing apparatus, where the apparatus is applied to a privacy computing unit and includes: an acquisition module, configured to obtain a user verification result acquisition request sent by a first institution; a determining module, configured to determine a verification result of a user that is requested by the user verification result acquisition request, where the verification result is a verification result obtained by performing matching verification on first data and second data; the first data is user basic data obtained by decrypting first encrypted data of the user that is sent by a second institution; the second data is user basic data obtained by decrypting second encrypted data of the user that is sent by a third institution; and the third institution is a trustworthy institution; and a first sending module, configured to send the verification result to the first institution.

Some embodiments of the present specification provide an information sharing device, including: at least one processor; and a memory communicably coupled to the at least one processor; where the memory stores instructions that can be executed by the at least one processor, and the instructions are executed by the at least one processor, to enable the at least one processor to: obtain a user verification result acquisition request sent by a first institution; determine a verification result of a user that is requested by the user verification result acquisition request, where the verification result is a verification result obtained by performing matching verification on first data and second data; the first data is user basic data obtained by decrypting first encrypted data of the user that is sent by a second institution; the second data is user basic data obtained by decrypting second encrypted data of the user that is sent by a third institution; and the third institution is a trustworthy institution; and send the verification result to the first institution.

At least one embodiment provided in the present specification can achieve the following beneficial effects:

After obtaining the user verification result acquisition request sent by the first institution, the privacy computing unit can determine the verification result of the user requested by the user verification result acquisition request, so as to share the verification result of the user with the first institution. In this solution, because the verification result of the user fed back by the privacy computing unit to the first institution is obtained by performing matching verification on the user basic data submitted by the user and sent by the second institution and real and trustworthy user basic data of the user sent by a trustworthy institution, trustworthiness of the user verification result received by the first institution can be improved. In addition, the user basic data sent by the second institution and the trustworthy institution to the privacy computing unit is encrypted, so user basic data leakage caused in a data transmission process can be avoided, and privacy of the user basic data is ensured.

BRIEF DESCRIPTION OF DRAWINGS

To describe technical solutions in the embodiments of the present specification or in the existing technology more clearly, the following briefly describes the accompanying drawings required for describing the embodiments or the existing technology. Clearly, the accompanying drawings in the following description merely show some embodiments of the present specification, and a person of ordinary skill in the art can still derive other drawings from these accompanying drawings without creative efforts.

DESCRIPTION OF EMBODIMENTS

Figure 1:
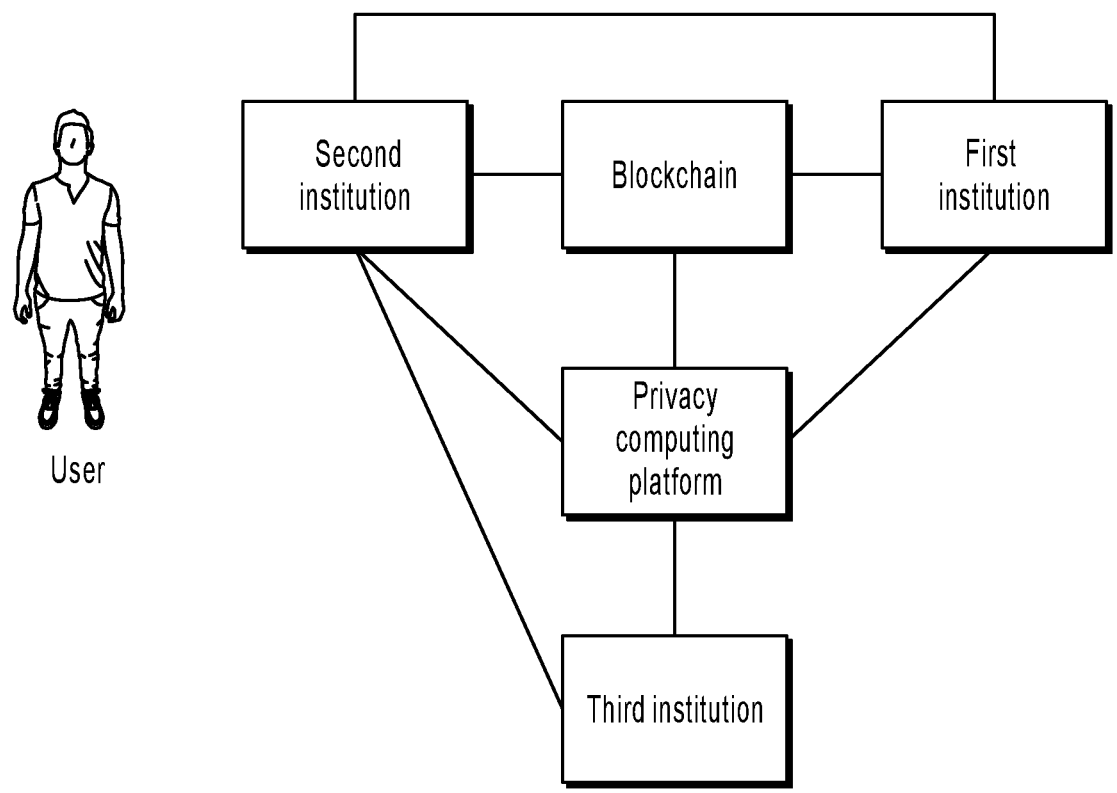
FIG. 1 is a schematic diagram illustrating an application scenario of an information sharing method, according to some embodiments of the present specification.

To make the objectives, technical solutions, and advantages of one or more embodiments of the present specification clearer, the following clearly and comprehensively describes the technical solutions of one or more embodiments of the present specification with reference to corresponding accompanying drawings and one or more specific embodiments of the present specification. Clearly, the described embodiments are merely some but not all of the embodiments of the present specification. All other embodiments obtained by a person of ordinary skill in the art based on the embodiments of the present specification without creative efforts shall fall within the protection scope of one or more embodiments of the present specification.

The technical solutions provided in the embodiments of the present specification are described in detail below with reference to the accompanying drawings.

In the existing technology, data sharing is often needed by institutions to process services. However, a single institution is often unable to obtain enough information to process a service, and needs to obtain information from other institutions. However, how to protect information privacy and trustworthiness in an information exchange and sharing process gradually becomes an urgent problem that needs to be solved.

For ease of understanding, an anti-money laundering scenario is used as an example for description.

Anti-money laundering is a measure to prevent money laundering activities that cover up and conceal sources and nature of earnings from drug crimes, organized crimes, terrorist crimes, smuggling crimes, corruption and bribery crimes, and crimes against financial management order by using various means. Common money laundering paths involve fields such as banking, insurances, securities, and real estate.

Since most anti-money laundering work require customer identity identification, a customer identity identification system emerges. The customer identity identification system, which is commonly referred to as Know Your Customer (KYC), refers to obtaining customer-related identification information, including knowing the identity of the customer when establishing a service relationship with the customer, knowing the purpose of the transaction, knowing the source and whereabouts of the capital, knowing the daily service activities and financial transactions of the customer, etc., and the customer identity identification system is the basis for anti-money laundering.

At present, there is a cooperative relationship between some financial institutions and sales agencies. A financial institution can sell its financial products through a sales agency, for example, a network platform can sell financial products of a fund company. In this case, customers who buy financial products are often customers of the sales agency. Based on the regulatory requirements, a KYC verification result for the customer is needed for financial product sales. As mentioned above, customers who purchase financial products are direct customers of a sales agency. The sales agency can directly obtain basic information of users, thus having the KYC capability. Based on requirements of data privacy protection, the sales agency usually cannot directly transfer KYC basic data and KYC verification results to a financial institution of a financial product. In addition, the financial institution does not have basic data of a user who purchases the financial product at the sales agency. Therefore, independent KYC verification cannot be performed. As a result, the financial institution cannot obtain the KYC verification result of the user and cannot meet regulation requirements. Therefore, needs for sharing information such as the user basic data and the user verification result are generated.

To solve the defect in the existing technology, this solution provides the following embodiments:

FIG. 1 is a schematic diagram illustrating an application scenario of an information sharing method, according to some embodiments of the present specification. As shown in FIG. 1, a second institution can be directly connected to a first institution, and both the first institution and the second institution are connected to a privacy computing platform. All of the first institution, the second institution, and the privacy computing platform can be connected to a blockchain system. A third institution can be respectively connected to the second institution and the privacy computing platform.

The second institution can directly receive basic information submitted by a user, so as to complete certain processing work based on the user basic information, for example, KYC verification mentioned in the KYC scenario. The second institution can further obtain highly trustworthy basic data of the user from the third institution, so as to perform matching verification based on the basic data submitted by the user and the highly trustworthy user basic data obtained from the third institution, thereby improving accuracy and authenticity of, for example, a KYC verification result.

In addition, the second institution can further provide the privacy computing platform with the basic data submitted by the user. Therefore, by using the privacy computing platform, a predetermined rule is executed in a trusted security computing environment, to complete a task such as KYC verification. The privacy computing platform can also obtain highly trustworthy basic data of the user from the third institution, so as to perform matching verification based on the user basic data submitted by the second institution and the highly trustworthy user basic data obtained from the third institution, thereby improving accuracy and authenticity of, for example, a KYC verification result.

The first institution can obtain, for example, the KYC verification result of the user from the privacy computing platform, so the first institution does not need to obtain the basic data submitted by the user from the second institution, and the first institution can also obtain a relatively authentic KYC verification result, so the first institution satisfies a regulation requirement for KYC of the user.

Next, an information sharing method provided in the embodiments of the present specification is specifically described with reference to the accompanying drawings.

Figure 2:
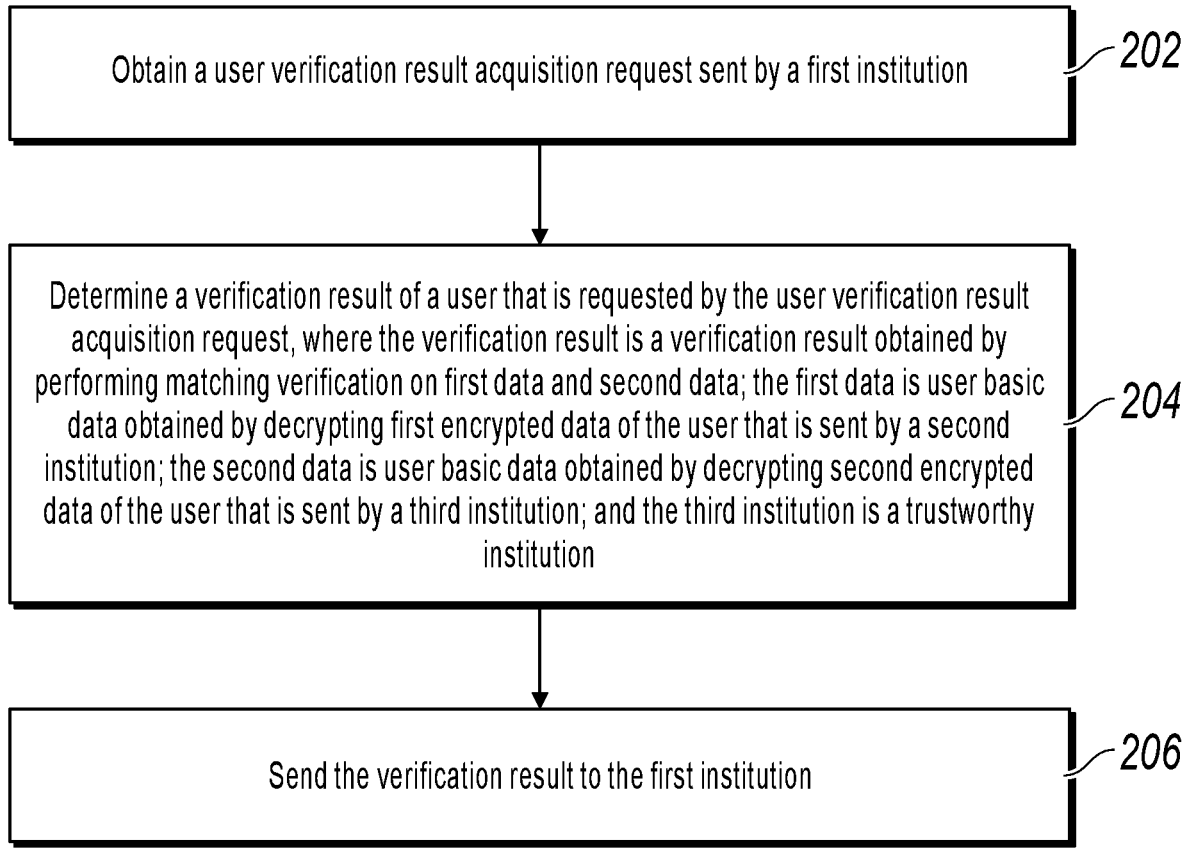
FIG. 2 is a schematic flowchart illustrating an information sharing method, according to some embodiments of the present specification.

FIG. 2 is a schematic flowchart illustrating an information sharing method, according to some embodiments of the present specification. From a program perspective, the process can be executed by a privacy computing unit. The privacy computing unit can be deployed on a blockchain or can be deployed outside a blockchain, which is not specifically limited.

The privacy computing unit deployed in a blockchain node can be an on-chain trusted execution environment (TEE) created by the blockchain node, and the on-chain TEE can run a virtual machine to execute a contract by using the virtual machine, so as to execute the process shown in FIG. 2 in a trusted and secret way.

However, the privacy computing unit deployed outside the blockchain (that is, an off-chain privacy computing node, which also belongs to the "privacy computing unit" in the embodiments of the present disclosure) can be an off-chain TEE created on a device outside the blockchain, so as to transfer a computing operation that originally needs to be performed on the blockchain node to the off-chain TEE in the off-chain privacy computing node for execution.

The off-chain TEE created on the off-chain privacy computing node is similar to the on-chain TEE created on the blockchain node, and can be a TEE implemented based on CPU hardware and fully isolated from the outside. After creating the off-chain TEE, the off-chain privacy computing node can implement a deployment operation on an off-chain contract and an operation of invoking the contract after the deployment by using the off-chain TEE, and ensure data security in the operation process.

Based on a verifiable computation technology, it can be proven that a computing result generated by the off-chain privacy computing unit is actually performed as expected in the TEE, thereby ensuring reliability of the computing result while reducing on-chain resource consumption.

As shown in FIG. 2, the process can include the following steps:

Step 202: Obtain a user verification result acquisition request sent by a first institution.

In the embodiments of the present specification, when the first institution does not have user basic data submitted by a user, the first institution cannot verify the user, so needs for directly obtaining a user verification result are generated. In this case, the first institution can send a user verification result acquisition request to a privacy computing unit, so as to request to obtain a user verification result of a specified user.

Step 204: Determine a verification result of a user that is requested by the user verification result acquisition request, where the verification result is a verification result obtained by performing matching verification on first data and second data; the first data is user basic data obtained by decrypting first encrypted data of the user that is sent by a second institution; the second data is user basic data obtained by decrypting second encrypted data of the user that is sent by a third institution; and the third institution is a trustworthy institution.

In the embodiments of the present specification, the second institution can refer to an institution that directly provides a service to a user, and the second institution has user basic data that is submitted when the user processes a service. The third institution can refer to a trustworthy institution that can provide real and trustworthy user basic data, such as an authority organization. Therefore, matching verification can be performed on the user basic data submitted by the user and sent by the second institution and the highly trustworthy user basic data of the user sent by the third institution, so as to determine whether the user basic data submitted by the user when the user processes a service at the second institution, thereby improving authenticity and accuracy of the user verification result.

In the embodiments of the present specification, the privacy computing unit can perform matching verification on the basic data of the user obtained from the second institution and the third institution, to determine the verification result of the user. To ensure security and privacy of the user basic data, the user basic data sent by the second institution and the third institution to the privacy computing unit can be encrypted. After decrypting the encrypted data sent by the second institution and the third institution, the privacy computing unit can determine the user verification result based on the decrypted user basic data.

Step 206: Send the verification result to the first institution.

In the embodiments of the present specification, the privacy computing unit can directly send the user verification result to the first institution, or can send the user verification result to a specified storage service medium, which is subsequently pulled by the first institution from the storage service medium. This is not specifically limited. It can be understood that the user verification result is shared with the first institution by using the privacy computing unit, so the first institution can also obtain the user verification result in a case in which the user basic data submitted when the user processes a service is not obtained, so as to satisfy a regulation or service requirement.

It should be understood that, in the methods described in one or more embodiments of the present specification, sequences of some steps in the method can be exchanged with each other based on actual needs, or some steps in the method can be omitted or deleted.

In the method in FIG. 2, the privacy computing unit can feed back, to the first institution, the relatively authentic user verification result that is obtained by performing matching verification on the user basic data obtained from the second institution and the trustworthy institution, and the user basic data obtained by the privacy computing unit from the second institution and the trustworthy institution is encrypted, so the method in FIG. 2 can not only ensure high trustworthiness of the user verification result received by the first institution, but also avoid a problem of user basic data leakage caused in a process of determining the user verification result, thereby ensuring privacy and security of the user basic data.

Based on the method in FIG. 2, embodiments of the present specification further provide some specific implementations of the method, which are described below.

Optionally, in the method in FIG. 2, the first institution can be a financial institution, and the second institution can be a sales agency that sells a financial product provided by the financial institution.

For ease of understanding, the method in FIG. 2 is applied to a KYC service scenario of anti-money laundering for description.

In the embodiments of the present specification, with its own platform or capability directly oriented to customers, the sales agency can sell the financial product provided by the financial institution. For example, a bank can sell fund products on behalf of a fund company or insurance products on behalf of an insurance institution. For another example, a payment platform can sell fund products on behalf of a fund company or insurance products on behalf of an insurance institution. Because a user can purchase the financial product provided by the financial institution through the sales agency, the sales agency can request the user to provide basic data for KYC verification, so the sales agency can obtain basic data submitted by the user. In practice, the sales agency can prompt the user to provide the basic data when the user registers, or can request the user to provide the basic data when the user initiates purchasing of a financial product by using the sales agency platform. This is not specifically limited.

In the embodiments of the present specification, such a user can be an individual user, an enterprise user, etc. For an individual user, the basic data of the user can include a part or all of information such as name, gender, nationality, certificate type, certificate number, age, occupation, mobile phone number, contact address, etc. of the individual. For an enterprise user, the basic data of the user can include a part or all of information such as name, business license number, business place address, name of legal representative, certificate type, certificate number, validity period, etc. of the enterprise. Most of the information is sensitive and is not expected to be output outside the sales agency, so the financial institution cannot obtain the user basic data submitted by the user, and cannot perform KYC verification by itself. Therefore, the financial institution needs to directly obtain the KYC verification result of the user, and the sales agency can provide the user basic data required for KYC verification. Therefore, the first institution can be the financial institution. Correspondingly, the second institution can be the sales agency.

In the embodiments of the present specification, the second institution can allocate unique user identity information, that is, a user ID (Identity document), to a user at the second institution. For example, the user ID can be an account registered by the user at the second institution, or an account allocated to the user by a system of the second institution when the user initiates a purchase operation at the second institution. Such an account can be, for example, a character string. The user ID should specifically identify a user. The corresponding field is information of the individual user or the enterprise user as described above.

For an individual user, if an identity card is uniformly used as the certificate type, the user ID can also be an identity card number. However, the identity card number is actually also personal privacy data. Therefore, considering that personal privacy data should not be disclosed, hash processing can be performed on the identity card number. Because hash calculation has a unidirectional feature and a feature of hiding original information, and a good hash function has an anti-collision capability, that is, there is a very high probability that hash values obtained by different inputs are also different, a hash calculation result (or referred to as a digest value) can be used as a user ID. This is also the case for the mobile phone number. That is, the user ID can be a digest value obtained through hash calculation on one or more pieces of information of the user.

Similarly, hash calculation can be performed after a group of data of a user is concatenated in order, and a digest value obtained is used as a user ID, for example, a digest value obtained by hash(name+certificate type+certificate number) is used as a user ID, where "+" can represent sequential concatenation of characters beforehand and afterward. KYC in anti-money laundering generally has a relatively high need for data security. To further strengthen data security protection, a salting operation can also be performed in hash calculation, for example, hash(name+certificate type+certificate number+salt), where salt is a value generated based on a predetermined rule. It can be understood that the user ID can further be a digest value obtained through salting hash calculation on one or more pieces of information of the user.

In the embodiments of the present specification, after obtaining the basic data of the user, the second institution can send the user ID of the user to the first institution, so the first institution requests to obtain the KYC verification result corresponding to the user ID.

For example, the sales agency can send the user ID to the financial institution in a process of transmitting order information of the financial product to the financial institution. Specifically, the sales agency can directly send the user ID to the financial institution, for example, send, to the financial institution, a digest value obtained by performing hash processing on one or more pieces of information of the user.

Or to improve security of data transmission, the user ID of the user can be encrypted and sent to the financial institution. For example, an identity card number or a mobile phone number that is used as the user ID is encrypted and sent to the financial institution, or the previously-mentioned digest value obtained by performing hash processing is encrypted and sent to the financial institution. For sending of the encrypted user ID to the financial institution, the user ID can be encrypted and sent to the financial institution by the sales agency in a symmetric or asymmetric encryption method. If symmetric encryption is used, that is, a case in which an encryption key and a decryption key are the same key, the key can be obtained through a key negotiation process between the sales agency and the financial institution. If asymmetric encryption is used, that is, an encryption key and a decryption key are two different but corresponding keys, one is a public key for encryption, and the another is a private key for decryption, generally, the sales agency can encrypt the user ID by using a public key of the financial institution, and then send the user ID to the financial institution, so the financial institution decrypts the user ID by using a corresponding private key.

In the embodiments of the present specification, the first institution can receive the user ID sent by the second institution. Therefore, the first institution can generate a user verification result acquisition request that includes the user ID, and send the user verification result acquisition request to the privacy computing unit, so as to request to obtain the user verification result corresponding to the user ID.

Specifically, step 202: obtain a user verification result acquisition request sent by the first institution, where the user verification result acquisition request can include user identity information (that is, a user ID) of a user corresponding to a requested user verification result.

The user ID can be a user ID of the user that is sent by the second institution to the first institution after the second institution obtains user basic data of the user. The user ID can specifically include an account registered by the user at the second institution, or an account allocated to the user by the system of the second institution when the user initiates a purchase operation at the second institution. The user ID can be a digest value obtained through hash calculation on one or more pieces of information of the user, or can be a digest value obtained through salting hash calculation on one or more pieces of information of the user. Because the previously-mentioned content has already explained and described implementations of the user ID, details are omitted here for simplicity.

Similarly, to improve security of data transmission, the user ID included in the user verification result acquisition request sent by the first institution can be encrypted. A principle of encrypting and decrypting the user ID included in the user verification result acquisition request can be the same as a principle of encrypting and decrypting the user ID when the second institution sends the user ID to the first institution. Similarly, a party that receives the user verification acquisition request can decrypt the encrypted user ID to recover the user ID. Details are not described again.

In the embodiments of the present specification, to prevent illegal tampering in a data transmission process, the user verification result acquisition request sent by the first institution can further include a signature of the first institution. For example, the financial institution can digitally sign the sent user verification result acquisition request by using a private key of the financial institution. Correspondingly, a recipient (for example, the privacy computing unit here) can verify the signature by using a public key of the financial institution, so the recipient can acknowledge that the received user verification result acquisition request is sent by the financial institution, and received content is complete and not tampered with.

In the embodiments of the present specification, after the user verification result acquisition request that includes the user ID and that is sent by the first institution is obtained, the user basic data submitted by the user corresponding to the user ID needs to be obtained from the second institution, and the real and trustworthy user basic data of the user corresponding to the user ID needs to be requested from the third institution, so as to perform an operation such as KYC verification of the user.

Therefore, step 204: Determine a verification result of the user that is requested by the user verification result acquisition request can specifically include:

sending the user verification result acquisition request to the second institution;

receiving first encrypted data of a user corresponding to the user identity information and sent by the second institution, and decrypting the first encrypted data to obtain the first data of the user;

obtaining second encrypted data of the user corresponding to the user identity information from the third institution, and decrypting the second encrypted data to obtain the second data of the user; and performing matching verification on the first data and the second data to obtain the verification result of the user.

For ease of understanding, the KYC verification scenario is still used as an example for description.

That is, in this implementation, the financial institution can send the user verification result acquisition request including the user ID to the sales agency by using the privacy computing unit. The sales agency can query the user basic data submitted, at the sales agency, by the user corresponding to the user ID included in the user verification result acquisition request, encrypt the found basic data of the user to obtain the first encrypted data, and feed back the first encrypted data to the privacy computing unit, so the privacy computing unit obtains the first data of the user to be verified after decrypting the first encrypted data. A principle of generating and decrypting the first encrypted data can be the same as a principle of encrypting and decrypting the user ID when the second institution sends the user ID to the first institution. Details are not described again.

In the embodiments of the present specification, because the privacy computing unit can be deployed on a blockchain or can be deployed outside a blockchain, the sending the user verification result acquisition request to the second institution can specifically include:

sending the user verification result acquisition request to the second institution by using the privacy computing unit deployed on the blockchain; or sending the user verification result acquisition request to the second institution by using the privacy computing unit deployed off a blockchain.

A smart contract can be deployed on a privacy computing unit deployed on the blockchain or outside the blockchain. Therefore, the first institution can invoke the smart contract deployed on the privacy computing unit to send the user verification result acquisition request to the second institution.

That is, the obtaining a user verification result acquisition request sent by the first institution can specifically include: obtaining a user verification result acquisition request sent by the first institution by initiating a first transaction, where the first transaction is used to invoke a first smart contract deployed on the privacy computing unit.

Correspondingly, the sending the user verification result acquisition request to the second institution can specifically include: invoking the first smart contract to send the user verification result acquisition request to the second institution.

In the embodiments of the present specification, the blockchain technology supports the user to create and invoke some complex logic in the blockchain network since Ethereum, which is one of the biggest advances of Ethereum compared with the bitcoin technology. An Ethereum virtual machine (EVM) is the core of Ethereum, which is a programmable blockchain, and each Ethereum node can run the EVM. The EVM is a Turing-complete virtual machine, through which various complex logics can be implemented. A user can deploy and invoke a smart contract by using the EVM in Ethereum. In the deployment phase, the user can send a transaction for creating a smart contract to Ethereum. The data field of the transaction can include a code (such as a bytecode) of the smart contract. The to field of the transaction is null. After diffusion and consensus of the transaction, each node in the Ethereum network can execute the transaction by using the EVM, and generate a corresponding contract instance, so as to complete deployment of the smart contract. In this case, the blockchain can have a contract account corresponding to the smart contract, and the contract account has a specific contract address. In the invoking phase, a user (which can be the same or different from the user deploying the smart contract) sends a transaction used to invoke a smart contract to the Ethereum network, where the from field of the transaction is an address of an external account corresponding to the user, the to field is a contract address of the smart contract that needs to be invoked, and the data field includes a method and a parameter for invoking the smart contract. After consensus is reached between the nodes by using the consensus mechanism, the smart contract invoked as declared by the above transaction is independently executed on each node of the Ethereum network under regulation, and all execution records and data are stored in the blockchain. Therefore, after the transaction is completed, transaction records that cannot be tampered with and will not be lost are stored in the blockchain. With development of blockchain technologies, in addition to the EVM, many other types of virtual machines, such as WebAssembly (WASM) virtual machines, are generated.

Each blockchain node can create and invoke a smart contract by using a virtual machine. It is a challenge for privacy protection to store transactions that include smart contracts and execution results of transactions in a blockchain ledger, or to store all ledgers on each full node in the blockchain. Privacy protection can be implemented by using a plurality of technologies, such as cryptography technologies (such as homomorphic encryption or zero-knowledge proof), hardware privacy technologies, and network isolation technologies. The hardware privacy protection technologies typically includes a trusted execution environment (TEE).

For example, the blockchain nodes can implement a secure execution environment for blockchain transactions by using the TEE. The TEE is a trusted execution environment that is based on a secure extension of CPU hardware and fully isolated from the outside. Currently, the industry attaches great importance to the TEE solution. Almost all mainstream chips and software alliances have their own TEE solutions, such as a trusted platform module (TPM) in a software aspect and Intel Software Guard Extensions (SGX), ARM Trustzone, and AMD Platform Security Processor (PSP) in a hardware aspect. The TEE can function as a hardware black box. Codes and data executed in the TEE cannot be peeped even at an operating system layer, and can be operated only by using an interface predefined in the codes. In terms of efficiency, because of the black box nature of the TEE, an operation in the TEE is performed on plaintext data instead of a complex cryptographic operation in homomorphic encryption, and efficiency of a calculation process is hardly lost. Therefore, by deploying the TEE environment on the blockchain node, privacy needs in the blockchain scenario can be satisfied to a great extent while a performance loss is relatively small.

Intel SGX (SGX for short) technology is used as an example. The blockchain node can create an enclave based on the SGX technology as a TEE for executing a blockchain transaction. The blockchain node can allocate a part of enclave page cache in a memory by using a processor instruction newly added to a CPU, so as to retain the previously-mentioned enclave. A memory area corresponding to the previously-mentioned EPC is encrypted by a memory encryption engine (MEE) in the CPU, content (codes and data in the enclave) in the memory area can be decrypted only in the CPU core, and keys used for encryption and decryption are generated and stored in the CPU only when the EPC starts. It can be understood that a security boundary of the enclave includes only itself and the CPU, neither privileged nor unprivileged software can access the enclave, and even an operating system administrator and a virtual machine monitor (VMM, or referred to as a hypervisor) is unable to affect the codes and data in the enclave. Therefore, the enclave has very high security. In addition, with the previously-mentioned security guarantee, the CPU can process a blockchain transaction in a plaintext form in the enclave, and has very high operation efficiency, so both data security and calculation efficiency are ensured. However, data that enters or exits the TEE can be encrypted, so as to ensure data privacy.

In the embodiments of the present specification, as previously described, the privacy computing unit in the blockchain node can be, for example, a TEE created by the blockchain node based on the SGX technology, so as to be used for executing the blockchain transaction in a trusted and secret way. A virtual machine can be run in the TEE, so a contract is executed by using the virtual machine. As such, for an encrypted transaction for invoking a contract that is sent to the privacy computing unit of the blockchain node, the privacy computing unit can decrypt and execute the encrypted transaction in the virtual machine loaded in the privacy computing unit, and can encrypt and output an execution result. The remote attestation technology in SGX can prove that it is legitimate SGX, and programs executed therein (e.g., virtual machine codes) are consistent with expectations. The invoked contract, as described above, can be deployed on the blockchain in advance. The deployed contract, through codes therein, can initiate an access request to data outside the blockchain during execution. Specifically, the user verification result acquisition request can be transmitted by the TEE in the blockchain node to the off-chain sales agency by using an oracle mechanism. As such, the financial institution can send the user verification result acquisition request to the privacy computing unit in a method of initiating a transaction for invoking a contract, and then the privacy computing unit sends the user verification result acquisition request to the sales agency.

Each blockchain node creates and invokes a smart contract by using a virtual machine, which consumes relatively more resources. Relative to using the TEE technology to protect privacy on each node in the blockchain network, a privacy computing node (that is, an off-chain privacy computing node) can be deployed outside the blockchain network (or referred to as "off-chain"), so computing operations that originally need to be performed on all the blockchain nodes are transferred to the off-chain privacy computing node for execution.

An off-chain TEE created on the off-chain privacy computing node is similar to the on-chain TEE created on the blockchain node, and can be a TEE implemented based on CPU hardware and fully isolated from the outside. After creating the off-chain TEE, the off-chain privacy computing node can implement a deployment operation on an off-chain contract and an operation of invoking the contract after the deployment by using the off-chain TEE, and ensure data security in the operation process.

Before being used, the privacy computing node can prove to a user that the privacy computing node is trustworthy. The process of proving itself trustworthy may involve a remote attestation report. The processes in which the on-chain and off-chain privacy computing nodes prove themselves trustworthy are similar. Using the off-chain privacy computing node as an example, a remote attestation report is generated in a remote attestation process for the off-chain TEE on the off-chain privacy computing node. The remote attestation report can be generated after an authoritative authentication server verifies self-recommendation information generated by the off-chain privacy computing node. The self-recommendation information is related to the off-chain TEE created on the off-chain privacy computing node. The off-chain privacy computing node generates the self-recommendation information related to the off-chain TEE, and after the authoritative authentication server verifies the self-recommendation information, the remote attestation report is generated, so the remote attestation report can be used to indicate that the off-chain TEE on the off-chain privacy computing node is trustworthy.

For example, when sending the user verification result acquisition request to the sales agency by using the privacy computing unit off the blockchain, the financial institution can first verify whether the privacy computing unit is trustworthy. Specifically, the financial institution can challenge the off-chain privacy computing node, and receive the remote attestation report returned by the off-chain privacy computing node. For example, the financial institution can initiate an off-chain challenge to the off-chain privacy computing node, that is, the process of initiating the challenge can be independent of the blockchain network, so a consensus process between the blockchain nodes can be skipped and on-chain and off-chain interoperability can be reduced. Therefore, the challenge of the financial institution to the off-chain privacy computing node has higher operational efficiency. For another example, the financial institution can use an on-chain challenge, for example, the financial institution can submit a challenge transaction to the blockchain node. Challenge information contained in the challenge transaction can be transmitted by the blockchain node to the off-chain privacy computing node by using the oracle mechanism, and the challenge information is used to challenge the off-chain privacy computing node. Regardless of the previously-mentioned on-chain challenge or the off-chain challenge, after obtaining the remote attestation report, a challenger (such as the financial institution) can verify a signature of the remote attestation report based on a public key of the authoritative authentication server, and if the verification succeeds, can acknowledge that the off-chain privacy computing node is trustworthy.

The off-chain privacy computing unit can store a pair of public and private keys in the TEE. The public key can be sent to the counterpart in a process such as a remote attestation process, and the private key is properly stored in the TEE. When it is determined, based on the remote attestation report, that the off-chain privacy computing node is trustworthy, the financial institution can encrypt and transmit a bytecode of the off-chain contract to the off-chain privacy computing node, and the off-chain privacy computing node obtains the bytecode through decryption in the off-chain trusted execution environment and deploys the bytecode. The previously-mentioned encryption can use the public key. In the previously-mentioned process, after a contract is deployed on the off-chain privacy computing node, the contract can be stored, and a hash value of the contract is calculated. The hash value of the contract can be fed back to the deployer of the contract. The deployer can locally generate a hash value for the deployed contract. Therefore, the deployer can compare whether a hash value of the deployed contract is the same as the local contract hash value. If they are the same, it indicates that the contract deployed on the off-chain privacy computing node is a contract deployed by the deployer. Content sent from the off-chain privacy computing node can be signed by using a private key stored in the TEE, so as to prove that the content is a result of execution by the TEE.

Actually, a plurality of smart contracts can be deployed in the TEE, and the TEE can generate a separate pair of public and private keys for each smart contract. Therefore, each deployed smart contract can have an ID (for example, a public key corresponding to the smart contract or a character string generated based on the public key), and a result of execution of each smart contract can also be signed by using a private key that is properly stored in the TEE and corresponding to the smart contract. As such, it can be proved that a result is a result of execution of a specific contract in the off-chain privacy computing node. As such, execution results of different contracts can be signed by different private keys. Only a corresponding public key can verify the signature, or if a corresponding public key cannot verify the signature, it cannot be proved that the result is an execution result of a corresponding contract. Therefore, it is equivalent to that an identity is assigned to the contract deployed in the off-chain privacy computing node by using a pair of public and private keys. The previous description uses the off-chain privacy contract as an example. The on-chain privacy contract is also similar, and can also have an identity, that is, have a pair of public and private keys.

Subsequently, the off-chain privacy computing node can invoke the deployed off-chain contract. Specifically, when the deployed off-chain contract is invoked, a bytecode of the deployed contract can be loaded and executed in the off-chain trusted execution environment, and an execution result can be fed back to an invoker of the contract, or fed back to a recipient specified in the contract or a recipient specified in a transaction for invoking the contract, or fed back to the blockchain node by using the oracle mechanism. The execution result fed back to the blockchain node by using the oracle mechanism can be further fed back to the recipient specified in the on-chain contract or to the recipient specified in the transaction for invoking the on-chain contract via the setting of the on-chain contract.

In addition, the execution result of the off-chain privacy computing node can be output after being encrypted by using a key. For example, in an asymmetric encryption method, the public key used for encryption can be the public key in the pair of public and private keys negotiated in the previously-mentioned challenge process. The challenger here can be the financial institution in the embodiments of the present specification, or can be the sales agency. Therefore, in the previously-mentioned method, it can be ensured that all data entering or exiting the off-chain privacy computing node is encrypted, so as to ensure security in a data transmission process. Similarly, data entering the off-chain privacy computing node can be signed by a sender by using a key of the sender. The principles in the subsequent similar steps are the same.

As such, by using the first smart contract deployed by the privacy computing unit, the user verification result acquisition request sent by the financial institution by initiating the first transaction for invoking the first smart contract can be received, and the user verification result acquisition request is sent to the sales agency in response to the invoking request.

In practice, the user verification result acquisition request can be digitally signed by using a private key of the privacy computing unit or the first smart contract, so as to invoke the first smart contract to send the user verification result acquisition request digitally signed by the privacy computing unit or the first smart contract to the sales agency. The sales agency can use a corresponding public key to perform signature verification on the signed user verification result acquisition request, and then feed back, in response to the user verification result acquisition request, the basic data submitted by the user to the privacy computing unit, to improve data security in a sharing process of the user basic data.

In the embodiments of the present specification, when the second institution feeds back the first encrypted data to the privacy data unit, the second institution can also invoke a smart contract.

Specifically, the receiving first encrypted data of a user corresponding to the user identity information and sent by the second institution, and decrypting the first encrypted data to obtain the first data of the user can include:

receiving a second transaction initiated by the second institution and used to invoke a second smart contract deployed on the privacy computing unit, where parameters in the second transaction include the user identity information and the first encrypted data of the user corresponding to the user identity information; and decrypting the first encrypted data to obtain the first data of the user.

In the embodiments of the present specification, an implementation principle of invoking the second smart contract in the privacy computing unit by the second institution can be the same as an implementation principle of invoking the first smart contract in the privacy computing unit by the first institution, and details are omitted here for simplicity.

The second smart contract can be used to receive an invoking request sent by the second institution, and store, in response to the invoking request, the user ID and the first encrypted data corresponding to the user ID that are sent by the second institution, so as to facilitate subsequent matching verification. In practice, the first data obtained after the first encrypted data is decrypted can also be preliminarily matched and verified by using the second smart contract, so as to determine whether the first data sent by the second institution satisfies a predetermined data format requirement.

For example, after the second smart contract obtains the user basic data sent by the sales agency, the second smart contract can be executed, so as to perform preliminary KYC matching verification based on the user basic data, so as to obtain a preliminary verification result. For example, for an individual user, the preliminary matching verification can include: whether a name format is correct, for example, whether a name includes 2 to 5 Chinese characters; whether a gender format is correct, such as male or female; whether a mobile phone number is correct, such as 11 digits, and begins with fields such as 13, 15, 17, 18, and 19; and whether a contact address is correct, for example, whether the contact address is a string of words containing the province/autonomous region/municipality to the street doorplate number. Therefore, the preliminary KYC verification result of the user can be obtained. The preliminary KYC verification result can be specifically, for example, {user ID, preliminary KYC verification result}. The preliminary KYC verification result is, for example, passed or failed.

In the embodiments of the present specification, to avoid illegal tampering with the first encrypted data sent by the second institution in a data transmission process, the second institution can further use a private key of the second institution to digitally sign the first encrypted data, so the privacy computing unit can receive the first encrypted data sent by the second institution and including the signature of the second institution. If the privacy computing unit successfully verifies the signature by using the public key of the second institution, it can be determined that the first encrypted data is not tampered with and is authentic and trustworthy.

In the embodiments of the present specification, the privacy computing unit can send, to a third institution in advance, identity information of a user whose user basic data needs to be obtained, so the third institution can determine a user corresponding to the user basic data that needs to be fed back to the privacy computing unit.

Therefore, before the obtaining second encrypted data of the user corresponding to the user identity information from the third institution, the method can further include:

sending a data acquisition request to the third institution, where the data acquisition request is used to request to obtain the user basic data of the user corresponding to the user identity information, and the data acquisition request includes the identity information of the user.

In the embodiments of the present specification, the privacy computing unit can determine the identity information of the user corresponding to the user ID based on the user verification result acquisition request including the user ID and sent by the financial institution, or based on the user ID sent by the sales agency and the user basic data corresponding to the user ID, and send the determined identity information to a trustworthy institution, so the trustworthy institution can specifically determine the user corresponding to the identity information based on the identity information. There can be a plurality of types of identity information. For example, when the user is an individual user, the identity information can be census register information of the user, an identification number of an identity document, etc. When the user is an enterprise user, the identity information can be a business license number, a unified social credit code of the enterprise, etc. This is not specifically limited.

In practice, there are a plurality of types of user basic data, and different trustworthy institutions can provide different types of trusted user basic data. For example, a Civil Administration Department can provide trusted user identity data, and an Industry and Commerce Department can provide trusted business license data, etc. Therefore, based on information of types of trusted user basic data that needs to be obtained, a data acquisition request can be sent to one or more trustworthy institutions that can provide such type of trusted user basic data, so all types of required trusted user basic data are obtained from one or more trustworthy institutions.

In the embodiments of the present specification, when the third institution feeds back the second encrypted data to the privacy data unit, the third institution can feed back the second encrypted data to the privacy data unit by invoking a smart contract.

Specifically, the obtaining second encrypted data of the user corresponding to the user identity information from the third institution, and decrypting the second encrypted data to obtain the second data of the user can include:

receiving a third transaction initiated by the third institution and used to invoke a third smart contract deployed on the privacy computing unit, where parameters in the third transaction include the second encrypted data of the user corresponding to the user identity information; and decrypting the second encrypted data to obtain the second data of the user.

In the embodiments of the present specification, an implementation principle of invoking the third smart contract in the privacy computing unit by the third institution can be the same as an implementation principle of invoking the first smart contract in the privacy computing unit by the first institution, and details are omitted here for simplicity.

The third smart contract can be used to receive an invoking request sent by the third institution, and receive, in response to the invoking request, the second encrypted data sent by the third institution, so as to store the second data obtained after the second encrypted data is decrypted, so the second data can be used in subsequent matching verification.

In the embodiments of the present specification, after obtaining the first data and the second data of the user, the privacy computing unit can generate the user verification result by using a smart contract.

Specifically, the performing matching verification on the first data and the second data can include:

invoking a fourth smart contract deployed on the privacy computing unit to perform matching verification on the first data and the second data.

In the embodiments of the present specification, consistency matching verification can be performed on the first data and the second data by using the fourth smart contract, so as to determine whether the user basic data submitted by the user and sent by the second institution is consistent with real and trustworthy user basic data. If they are consistent, it can be determined that the user basic data used by the user at the second institution is authentic, and verification succeeds. If they are not consistent, it can be determined that the user basic data used by the user at the second institution is false, and verification fails.

For example, the fourth smart contract can perform relatively authentic KYC matching verification on the user basic data (that is, the first data) submitted by the user at the sales agency and the trusted user basic data (that is, the second data) at the trustworthy institution, so as to obtain a relatively authentic user verification result.

Specifically, for an individual user, the relatively authentic KYC matching verification can include: whether a name in the first data is consistent with a name in the second data; whether gender in the first data is consistent with gender in the second data; whether a mobile phone number in the first data is consistent with at least one mobile phone number in the second data; whether a contact address in the first data is consistent with a contact address in the second data; etc. If the first data is consistent with user basic data of the same type in the second data, it can be determined that the user basic data of this type is successfully verified, and if the first data is inconsistent with the user basic data of the same type, it can be determined that the user basic data of this type does not pass the verification. Therefore, a relatively authentic KYC verification result of the user can be obtained. Based on the KYC verification result, false user basic data and authentic user basic data that are used by the user at the sales agency can be determined. For example, the relatively authentic KYC verification result can be specifically: {user ID, KYC verification result}. The KYC verification result is, for example, passed or failed; or a type of data that passes the verification and a type of data that fails the verification, for example, name and gender verification passed, and mobile phone number and contact address verification failed.

In the embodiments of the present specification, to avoid illegal tampering with the second encrypted data sent by the third institution in a data transmission process, the third institution can further use a private key of the third institution to digitally sign the second encrypted data, so the privacy computing unit can obtain the second encrypted data including the signature of the third institution from the third institution. If the privacy computing unit successfully verifies the signature by using the public key of the third institution, it can be determined that the second encrypted data is not tampered with and is authentic and trustworthy.

In the embodiments of the present specification, any plurality of smart contracts in the first smart contract, the second smart contract, the third smart contract, and the fourth smart contract can be the same smart contract, or can be different smart contracts. For example, the previously-mentioned four smart contracts can be the same smart contract, so the financial institution, the sales agency, and the trustworthy institution can respectively invoke the smart contract, so as to implement a plurality of functions such as forwarding the user verification result acquisition request, receiving the first encrypted data, receiving the second encrypted data, and performing matching verification on the decrypted first data and second data. Or the previously-mentioned four smart contracts can be four different smart contracts. In addition to receiving the first encrypted data fed back by the sales agency, the second smart contract can further send the identity information of the user to the trustworthy institution. In addition to receiving the second encrypted data fed back by the trustworthy institution, the third smart contract can be further used to invoke the fourth smart contract to perform matching verification etc. This is not specifically limited.

In the embodiments of the present specification, when the user verification result acquisition request including the user ID and sent by the first institution is obtained, the user verification result corresponding to the user ID is possibly generated in advance at the privacy computing unit.

Therefore, step 204: Determine a verification result of the user that is requested by the user verification result acquisition request can specifically include:

determining a verification result of a user corresponding to the user identity information from a pre-generated user verification result, where the verification result of the user is a user verification result obtained by performing matching verification on the first data and the second data in advance.

In this implementation, after receiving the user ID sent by the second institution, the first institution can send a user basic data sharing request to the second institution without using the privacy computing unit, and the second institution can send the first encrypted data to the privacy computing unit in response to the user basic data sharing request. The privacy computing unit can determine the identity information of the user based on the first encrypted data, and obtain the second encrypted data of the user corresponding to the identity information from the third institution, so as to pre-generate and store the user verification result of the user based on the first data and the second data of the user that are obtained after the first encrypted data and the second encrypted data are decrypted. Therefore, after receiving the user verification result acquisition request of the first institution, the privacy computing unit can determine the user verification result requested by the first institution from the user verification result generated in advance, without needing to generate the user verification result in real time. It can be understood that in this implementation, the user verification result can be fed back to the first institution more efficiently and quickly.

For example, the financial institution can directly send a user basic data sharing request to the sales agency. Specifically, the financial institution can encrypt the user ID in the user basic data sharing request to be transmitted by using a public key of the sales agency. As such, only the sales agency can decrypt the user ID in the user basic data sharing request, because only the sales agency has a private key corresponding to the public key. Therefore, the sales agency can locally search for the user basic data corresponding to the user ID in response to the user basic data sharing request, so as to send the encrypted user ID and the encrypted user basic data corresponding to the encrypted user ID (that is, the first encrypted data) to the privacy computing unit. In this case, the privacy computing unit does not receive the user verification result acquisition request sent by the financial institution, and the privacy computing unit can still request, based on the user ID and the user basic data sent by the sales agency, the trusted basic data of the user corresponding to the user ID from the trustworthy institution, so as to perform matching verification in advance based on the user basic data fed back by the financial institution and the trustworthy institution, so as to pre-generate and store the user verification result corresponding to the user ID.

In practice, the financial institution can also sign the sent user basic data sharing request by using the private key of the financial institution. Correspondingly, the recipient (for example, the sales agency here) can verify the signature by using the public key of the financial institution, so the recipient can acknowledge that the received user basic data sharing request is sent by the financial institution, and the received content is complete and not tampered with. Details are not described again.

In the embodiments of the present specification, to further improve security of data transmission, that is, although encrypted data is transmitted, an incorrect recipient is not expected to receive the encrypted data. Therefore, before sending the user verification result acquisition request including the user ID to the second institution, the privacy computing unit can further first acknowledge an identity of the counterpart, which is the second institution. That is, the privacy computing unit determines that the second institution is an institution satisfying a predetermined regulation.

Similarly, before the second institution sends the first encrypted data of the user to the privacy computing unit, the privacy computing unit further needs to prove an identity of the privacy computing unit to the second institution.

Before obtaining the second encrypted data of the user from the third institution, the privacy computing unit can further determine that the third institution is an institution satisfying a predetermined regulation, and prove the identity of the privacy computing unit to the third institution.

In the embodiments of the present specification, there are several methods for determining the identity of the counterpart. An implementation of using a distributed digital identity technology combined with a blockchain is listed here. A blockchain can provide a decentralized (or weakly centralized), non-tampering (or difficult to tamper with), trusted distributed ledger, and can provide a secure, stable, transparent, auditable, and efficient method of recording transactions and data information interaction. A blockchain network can include a plurality of nodes. Generally, one or more nodes of the blockchain belong to one participant. Generally, the more participants in a blockchain network, the more authoritative the participants are, the more trustworthy the blockchain network is. Here, a blockchain network formed by a plurality of participants is referred to as a blockchain platform. The blockchain platform can help verify the identity of each institution.

The same principle can be used in an identity verification process between the privacy computing unit and each of the second institution and the third institution. Therefore, for ease of understanding, an example in which the privacy computing unit verifies the identity of the second institution (that is, the sales agency) is used here for description.

In order to use the distributed digital identity service provided by the blockchain platform, the sales agency can register its identity in the blockchain platform. For example, the sales agency can create a pair of public and private keys, secretly store the private key, and can create a distributed digital identity (also referred to as a decentralized identifier, DID). In practice, the sales agency can create the DID by itself, or can request a decentralized identity service (DIS) system to create the DID. The DIS is a blockchain-based identity management solution that provides functions such as creating, verifying, and managing digital identities, so as to manage and protect entity data under regulation, ensure authenticity and efficiency of information flow, and solve problems such as cross-institution identity authentication and data cooperation. The DIS system can be connected to the blockchain platform. A DID can be created for the sales agency by using the DIS system, the DID and the public key are sent to the blockchain platform for storage, and the created DID is further returned to the sales agency. The public key can be included in DIDdoc, which can be stored in the blockchain platform. The DIS can create the DID for the sales agency based on the public key sent by the sales agency. For example, the DID is created after the public key of the sales agency is calculated by using the hash function, or can be created based on other information of the sales agency (which can include the public key or not include the public key). The latter case may need the sales agency to provide information other than the public key. Afterward, the sales agency can provide a verification function to prove to other parties that it is the sales agency.

Figure 3:
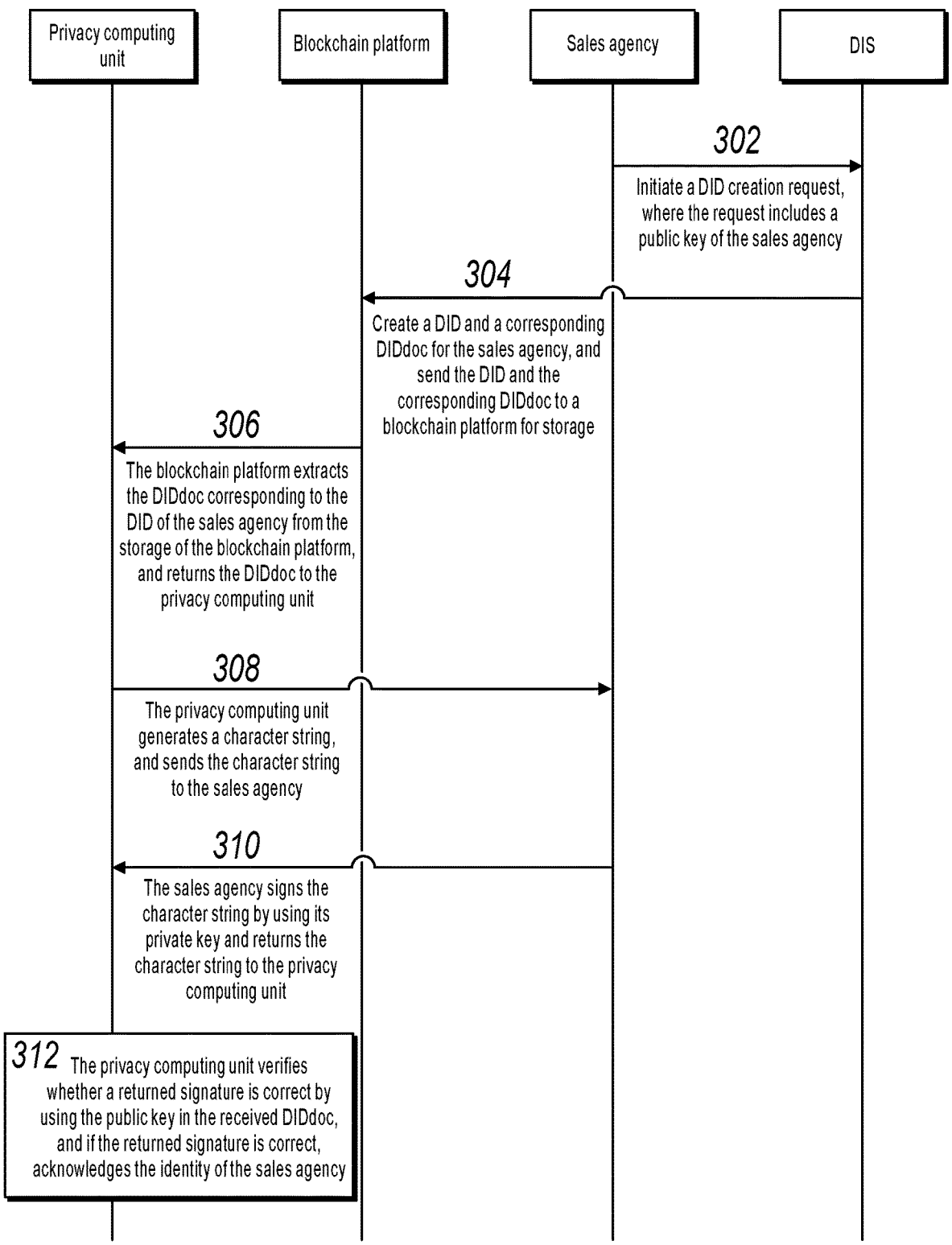
FIG. 3 is a schematic flowchart illustrating a method for verifying, by a privacy computing unit, an identity of a sales agency, according to some embodiments of the present specification.

FIG. 3 is a schematic flowchart illustrating a method for verifying, by a privacy computing unit, an identity of a sales agency, according to some embodiments of the present specification, as shown in FIG. 3.

Step 302: The sales agency initiates a DID creation request to a DIS, where the request includes a public key of the sales agency.

Step 304: In response to the creation request, the DIS creates a DID and a corresponding DIDdoc for the sales agency, and sends the DID and the corresponding DIDdoc to a blockchain platform for storage, where the DIDdoc includes the public key of the sales agency.

Step 306: The blockchain platform receives a verification request sent by the privacy computing unit, where the verification request includes the DID of the sales agency; and the blockchain platform extracts the DIDdoc corresponding to the DID from the storage of the blockchain platform, and returns the DIDdoc to the privacy computing unit.

Step 308: The privacy computing unit generates a character string, and sends the character string to the sales agency.

Step 310: The sales agency signs the character string by using its private key and returns the character string to the privacy computing unit.

Step 312: The privacy computing unit verifies whether a returned signature is correct by using the public key in the previously received DIDdoc, and if the returned signature is correct, acknowledges the identity of the sales agency. Therefore, it can be determined whether the sales agency is an institution satisfying a predetermined regulation.

It can be understood that the procedure in FIG. 3 enables the privacy computing unit to verify the identity of the sales agency. There is no strict sequence between S306 and S308 and S310. This is not specifically limited.

In the embodiments of the present specification, the privacy computing unit can further send a proof of the user verification result to the blockchain for subsequent use.

Therefore, the method in FIG. 2 can further include: sending the proof of the verification result to the blockchain. A blockchain network that stores the proof of the verification result and the blockchain network that the privacy computing platform is deployed can be the same blockchain network, or can be different blockchain networks. This is not specifically limited here.

The proof of the verification result can include a verifiable claim (VC) signed by the privacy computing unit. The VC is also an important application in the DID. The VC can be stored on the blockchain platform. For example, content of the VC includes that user basic data corresponding to a user ID/some user IDs has been matched by the privacy computing unit based on a predetermined rule, and is signed by the privacy computing unit; or includes a hash value of the user verification result, which is signed by the privacy computing unit. That is, the proof of the verification result can include: a verifiable claim signed by the privacy computing unit, or a hash value signed by the privacy computing unit, where the hash value is a hash value obtained by performing hash calculation on the verification result.

When examining, for example, the KYC verification result of the user by the first institution, the regulatory organization can verify the VC by using the blockchain in addition to obtaining the KYC verification result of the user from the first institution. Specifically, when obtaining the public key in the DIDdoc of the privacy computing unit from the blockchain, and verifying the KYC verification result of the user ID of the first institution, the regulatory organization can further verify the signature of the VC by using the public key of the privacy computing unit, so as to acknowledge that the VC is issued by the privacy computing unit and is complete, that is, the VC is not tampered with. As such, authenticity acknowledgement of the KYC verification result provided by the first institution can be improved based on a non-tampering feature of the blockchain platform and trustworthiness of a signing institution. The trustworthiness of the signing institution, that is, the trustworthiness of the privacy computing unit or the fourth smart contract for generating the user verification result, can be implemented by auditing the identity of the privacy computing unit and the contract code deployed therein. The identity of the privacy computing unit is audited, for example, the previously-mentioned challenge initiation process can verify that the identity of the privacy computing unit is trustworthy.

As such, by using the solution in the previously-mentioned embodiment, an institution that originally does not have the capability to perform anti-money laundering work can be empowered, so such an institution (for example, the first institution, that is, the financial institution) can have a KYC verification result of a user who purchases a financial product of the institution, thereby satisfying a specified anti-money laundering audit obligation, and improving an overall KYC verification capability of the industry.

Figure 4:
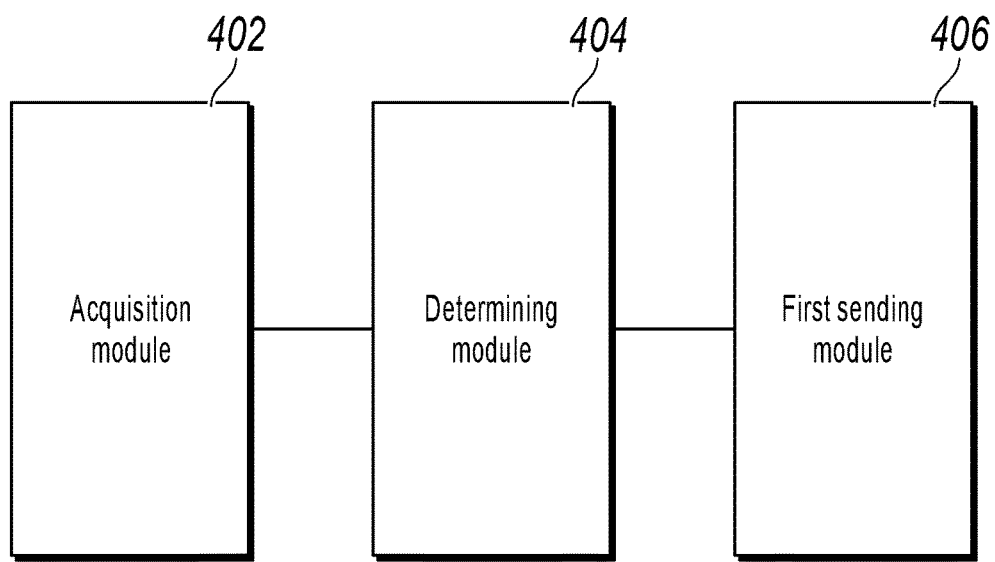
FIG. 4 is a schematic structural diagram illustrating an information sharing apparatus corresponding to FIG. 2, according to some embodiments of the present specification.

Based on the same idea, some embodiments of the present specification further provide apparatuses that correspond to the previously-mentioned method. FIG. 4 is a schematic structural diagram illustrating an information sharing apparatus corresponding to FIG. 2, according to some embodiments of the present specification. The apparatus can be applied to a privacy computing unit. As shown in FIG. 4, the apparatus can include:

an acquisition module 402, configured to obtain a user verification result acquisition request sent by a first institution;

a determining module 404, configured to determine a verification result of a user that is requested by the user verification result acquisition request, where the verification result is a verification result obtained by performing matching verification on first data and second data; the first data is user basic data obtained by decrypting first encrypted data of the user that is sent by a second institution; the second data is user basic data obtained by decrypting second encrypted data of the user that is sent by a third institution; and the third institution is a trustworthy institution; and a first sending module 406, configured to send the verification result to the first institution.

Based on the apparatus in FIG. 4, embodiments of the present specification further provide some specific implementations of the method, which are described below.

Optionally, the first institution can be a financial institution, and the second institution can be a sales agency.

Optionally, the user verification result acquisition request can include user identity information of the user.

Optionally, the user identity information can be identity information of the user that is sent by the second institution to the first institution after the second institution obtains the user basic data of the user.

Optionally, the user identity information can include an account registered by the user at the second institution, or an account allocated to the user by the system of the second institution when the user initiates a purchase operation at the second institution.

Optionally, the user identity information can include a digest value obtained through hash calculation on one or more pieces of information of the user.

Optionally, the user identity information can include a digest value obtained through salting hash calculation on one or more pieces of information of the user.

Optionally, the user identity information included in the user verification result acquisition request can be encrypted.

Optionally, the user verification result acquisition request can further include a signature of the first institution.

Optionally, the determining module 404 can include:

a verification result determining unit, configured to determine a verification result of a user corresponding to the user identity information from a pre-generated user verification result, where the verification result of the user is a user verification result obtained by performing matching verification on the first data and the second data in advance.

Optionally, the determining module 404 can include:

a first sending unit, configured to send the user verification result acquisition request to the second institution;

a receiving unit, configured to: receive first encrypted data of a user corresponding to the user identity information and sent by the second institution, and decrypt the first encrypted data to obtain the first data of the user;

an acquisition unit, configured to obtain second encrypted data of the user corresponding to the user identity information from the third institution, and decrypting the second encrypted data to obtain the second data of the user; and a verification unit, configured to perform matching verification on the first data and the second data to obtain the verification result of the user.

Optionally, the first sending unit can be specifically configured to:

send the user verification result acquisition request to the second institution by using the privacy computing unit deployed on a blockchain; or send the user verification result acquisition request to the second institution by using the privacy computing unit deployed off the blockchain.

Optionally, the acquisition module 402 can be specifically configured to:

obtain a user verification result acquisition request sent by the first institution by initiating a first transaction, where the first transaction is used to invoke a first smart contract deployed on the privacy computing unit.

Optionally, the first sending unit can be specifically configured to:

invoke the first smart contract to send the user verification result acquisition request digitally signed by the privacy computing unit to the second institution; or invoke the first smart contract to send the user verification result acquisition request digitally signed by the first smart contract to the second institution.

Optionally, the receiving unit can be specifically configured to:

receive a second transaction initiated by the second institution and used to invoke a second smart contract deployed on the privacy computing unit, where parameters in the second transaction include the user identity information and the first encrypted data of the user corresponding to the user identity information; and decrypt the first encrypted data to obtain the first data of the user.

Optionally, the acquisition unit can be specifically configured to:

receive a third transaction initiated by the third institution and used to invoke a third smart contract deployed on the privacy computing unit, where parameters in the third transaction include the second encrypted data of the user corresponding to the user identity information; and decrypt the second encrypted data to obtain the second data of the user.

Optionally, the verification unit can be specifically configured to:

invoke a fourth smart contract deployed on the privacy computing unit to perform matching verification on the first data and the second data.

Optionally, the determining module 404 can further include:

a first determining unit, configured to determine that the second institution is an institution satisfying a predetermined regulation.

Optionally, the determining module 404 can further include:

a first proving unit, configured to prove, by the privacy computing unit, an identity of the privacy computing unit to the second institution.

Optionally, the determining module 404 can further include:

a second determining unit, configured to determine that the third institution is an institution satisfying a predetermined regulation.

Optionally, the determining module 404 can further include:

a second proving unit, configured to prove, by the privacy computing unit, an identity of the privacy computing unit to the third institution.

Optionally, the receiving unit can be specifically configured to:

receive the first encrypted data sent by the second institution and including a signature of the second institution.

Optionally, the acquisition unit can be specifically configured to:

obtain the second encrypted data including a signature of the third institution from the third institution.

Optionally, the determining module 404 can further include:

a second sending unit, configured to send a data acquisition request to the third institution, where the data acquisition request is used to request to obtain the user basic data of the user corresponding to the user identity information, and the data acquisition request includes the identity information of the user.

Optionally, the apparatus in FIG. 4 can further include:

a second sending module, configured to send a proof of the verification result to a blockchain.

Optionally, the proof of the verification result includes: a verifiable claim signed by the privacy computing unit, or a hash value signed by the privacy computing unit, where the hash value is a hash value obtained by performing hash calculation on the verification result.

Based on the same idea, embodiments of the present specification further provide devices that correspond to the previously-mentioned methods.

Figure 5:
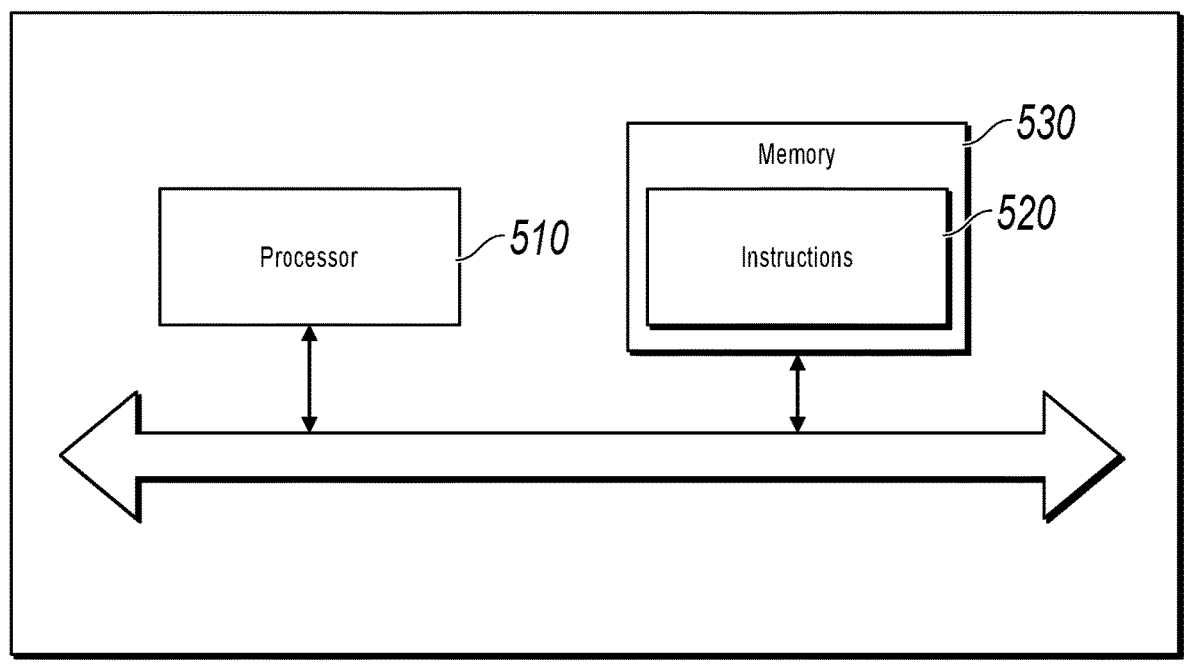
FIG. 5 is a schematic structural diagram illustrating an information sharing device corresponding to FIG. 2, according to some embodiments of the present specification.

FIG. 5 is a schematic structural diagram illustrating an information sharing device corresponding to FIG. 2, according to some embodiments of the present specification. As shown in FIG. 5, the device 500 can include:

at least one processor 510; and a memory 530 communicably coupled to the at least one processor; where the memory 530 stores instructions 520 that can be executed by the at least one processor 510, where the instructions 520 can be instructions in a privacy computing unit, and the instructions 520 are executed by the at least one processor 510, so the at least one processor 510 can:

obtain a user verification result acquisition request sent by a first institution;

determine a verification result of a user that is requested by the user verification result acquisition request, where the verification result is a verification result obtained by performing matching verification on first data and second data; the first data is user basic data obtained by decrypting first encrypted data of the user that is sent by a second institution; the second data is user basic data obtained by decrypting second encrypted data of the user that is sent by a third institution; and the third institution is a trustworthy institution; and send the verification result to the first institution.

The embodiments in the present specification are described in a progressive way. For same or similar parts of the embodiments, references can be made to the embodiments. Each embodiment focuses on a difference from other embodiments. Especially, the device shown in FIG. 5 are basically similar to method embodiments, and therefore are described briefly; for related parts, reference can be made to some descriptions in the method embodiments.

In the 1990s, whether a technical improvement is a hardware improvement (for example, an improvement of a circuit structure, such as a diode, a transistor, or a switch) or a software improvement (an improvement of a method procedure) can be clearly distinguished. However, as technologies develop, current improvements of many method procedures can be considered as direct improvements of hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the previously-mentioned several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previously-mentioned embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present specification is implemented, a function of each unit can be implemented in one or more pieces of software and/or hardware.

A person skilled in the art should understand that embodiments of the present disclosure can be provided as methods, systems, or computer program products. Therefore, the present disclosure can use a form of hardware only embodiments, software only embodiments, or embodiments with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the embodiments of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory may include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computer device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that embodiments of the present specification can be provided as methods, systems, or computer program products. Therefore, the present specification can use a form of hardware only embodiments, software only embodiments, or embodiments with a combination of software and hardware. In addition, the present specification can use a form of a computer program product that is implemented on one or more computer-usable storage media (including but not limited to a disk memory, a CD-ROM, an optical memory, etc.) that include computer-usable program code.

The present specification can be described in the general context of computer executable instructions executed by a computer, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

The previously-mentioned descriptions are merely embodiments of the present specification, and are not intended to limit the present specification. A person skilled in the art can make various modifications and changes to the present specification. Any modification, equivalent replacement, or improvement made without departing from the spirit and principle of the present specification shall fall within the scope of the claims in the present specification.

What is claimed is:

1. A computer-implemented method, comprising:
   receiving, by a trusted execution environment (TEE), a user verification result acquisition request from a first institution, wherein the user verification result acquisition request is configured to request a verification result associated with a user;
   receiving, by the TEE, first encrypted data of the user from a second institution;
   decrypting, by the TEE, the first encrypted data to obtain first user basic data;
   receiving, by the TEE, second encrypted data of the user from a trusted institution;
   decrypting, by the TEE, the second encrypted data of the user to obtain second user basic data;
   in response to the user verification result acquisition request, determining, by the TEE, the verification result of the user, wherein the verification result indicates whether the first user basic data matches the second user basic data; and
   sending, by the TEE, the verification result of the user to the first institution.

2. The computer-implemented method of claim 1, wherein the first user basic data and the second user basic data comprise user identities comprising at least one of a name of the user, a gender of the user, a phone number of the user, or an address of the user, and wherein the verification result indicates the first user basic data matches the second user basic data if at least one of the user identities comprised in the first user basic data and the second user basic data matches.

3. The computer-implemented method of claim 1, wherein the user verification result acquisition request comprises user identity information of the user, and wherein the user identity information comprises a digest value obtained through a hash calculation on one or more pieces of information of the user.

4. The computer-implemented method of claim 3, wherein the user identity information comprises an account registered by the user at the second institution or assigned to the user by the second institution in response to an operation initiated by the user at the second institution.

5. The computer-implemented method of claim 3, wherein determining the verification result of the user comprises:
   sending, by the TEE, the user verification result acquisition request to the second institution;
   receiving, by the TEE, the first encrypted data from the second institution; and
   receiving, by the TEE, the second encrypted data of the user from the trusted institution.

6. The computer-implemented method of claim 5, wherein receiving the user verification result acquisition request from the first institution comprises:
   initiating, by the TEE, a first transaction to receive the user verification result acquisition request; and
   in response to the first transaction, invoking, by the TEE, a smart contract deployed on the TEE.

7. The computer-implemented method of claim 6, wherein sending the user verification result acquisition request to the second institution comprises:
   invoking, by the TEE, the smart contract to send the user verification result acquisition request to the second institution.

8. A non-transitory, computer-readable medium storing one or more instructions executable by a computer system to perform operations comprising:
   receiving, by a trusted execution environment (TEE), a user verification result acquisition request from a first institution, wherein the user verification result acquisition request is configured to request a verification result associated with a user;
   receiving, by the TEE, first encrypted data of the user from a second institution;
   decrypting, by the TEE, the first encrypted data to obtain first user basic data;
   receiving, by the TEE, second encrypted data of the user from a trusted institution;
   decrypting, by the TEE, the second encrypted data of the user to obtain second user basic data;
   in response to the user verification result acquisition request, determining, by the TEE, the verification result of the user, wherein the verification result indicates whether the first user basic data matches the second user basic data; and
   sending, by the TEE, the verification result of the user to the first institution.

9. The non-transitory, computer-readable medium of claim 8, wherein the first user basic data and the second user basic data comprise user identities comprising at least one of a name of the user, a gender of the user, a phone number of the user, or an address of the user, and wherein the verification result indicates the first user basic data matches the second user basic data if at least one of the user identities comprised in the first user basic data and the second user basic data matches.

10. The non-transitory, computer-readable medium of claim 8, wherein the user verification result acquisition request comprises user identity information of the user, and wherein the user identity information comprises a digest value obtained through a hash calculation on one or more pieces of information of the user.

11. The non-transitory, computer-readable medium of claim 10, wherein the user identity information comprises an account registered by the user at the second institution or assigned to the user by the second institution in response to an operation initiated by the user at the second institution.

12. The non-transitory, computer-readable medium of claim 10, wherein determining the verification result of the user comprises:
   sending, by the TEE, the user verification result acquisition request to the second institution;
   receiving, by the TEE, the first encrypted data from the second institution; and
   receiving, by the TEE, the second encrypted data of the user from the trusted institution.

13. The non-transitory, computer-readable medium of claim 12, wherein receiving the user verification result acquisition request from the first institution comprises:
   initiating, by the TEE, a first transaction to receive the user verification result acquisition request; and
   in response to the first transaction, invoking, by the TEE, a smart contract deployed on the TEE.

14. The non-transitory, computer-readable medium of claim 13, wherein sending the user verification result acquisition request to the second institution comprises:
invoking, by the TEE, the smart contract to send the user verification result acquisition request to the second institution.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a trusted execution environment (TEE), a user verification result acquisition request from a first institution, wherein the user verification result acquisition request is configured to request a verification result associated with a user;
receiving, by the TEE, first encrypted data of the user from a second institution;
decrypting, by the TEE, the first encrypted data to obtain first user basic data;
receiving, by the TEE, second encrypted data of the user from a trusted institution;
decrypting, by the TEE, the second encrypted data of the user to obtain second user basic data;
in response to the user verification result acquisition request, determining, by the TEE, the verification result of the user, wherein the verification result indicates whether the first user basic data matches the second user basic data; and
sending, by the TEE, the verification result of the user to the first institution.

16. The computer-implemented system of claim 15, wherein the first user basic data and the second user basic data comprise user identities comprising at least one of a name of the user, a gender of the user, a phone number of the user, or an address of the user, and wherein the verification result indicates the first user basic data matches the second user basic data if at least one of the user identities comprised in the first user basic data and the second user basic data matches.

17. The computer-implemented system of claim 15, wherein the user verification result acquisition request comprises user identity information of the user, and wherein the user identity information comprises a digest value obtained through a hash calculation on one or more pieces of information of the user.

18. The computer-implemented system of claim 17, wherein the user identity information comprises an account registered by the user at the second institution or assigned to the user by the second institution in response to an operation initiated by the user at the second institution.

19. The computer-implemented system of claim 17, wherein determining the verification result of the user comprises:
sending, by the TEE, the user verification result acquisition request to the second institution;
receiving, by the TEE, the first encrypted data from the second institution; and
receiving, by the TEE, the second encrypted data of the user from the trusted institution.

20. The computer-implemented system of claim 19, wherein receiving the user verification result acquisition request from the first institution comprises:
initiating, by the TEE, a first transaction to receive the user verification result acquisition request; and
in response to the first transaction, invoking, by the TEE, a smart contract deployed on the TEE.

* * * * *